US007865781B2

(12) United States Patent
Fox et al.

(10) Patent No.: US 7,865,781 B2
(45) Date of Patent: *Jan. 4, 2011

(54) AUTOMATED DIAGNOSTIC SERVICE

(75) Inventors: Thomas J. Fox, Apex, NC (US); Eric R. Kern, Durham, NC (US); Charles C. Queen, Cary, NC (US); Celia A. Schreiber, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 513 days.

This patent is subject to a terminal disclaimer.

(21) Appl. No.: 12/020,864

(22) Filed: Jan. 28, 2008

(65) Prior Publication Data

US 2008/0184271 A1 Jul. 31, 2008

Related U.S. Application Data

(63) Continuation of application No. 10/462,254, filed on Jun. 16, 2003, now Pat. No. 7,350,112.

(51) Int. Cl.
*G06F 11/00* (2006.01)
(52) U.S. Cl. ......................................................... 714/38
(58) Field of Classification Search .................. 714/25, 714/27, 37, 38, 44; 702/183, 188
See application file for complete search history.

(56) References Cited

U.S. PATENT DOCUMENTS

| | | | |
|---|---|---|---|
| 4,866,635 A | 9/1989 | Kahn et al. |
| 5,119,377 A | 6/1992 | Cobb et al. |
| 5,367,667 A | 11/1994 | Wahlquist et al. |
| 5,483,637 A | 1/1996 | Winokur et al. |
| 5,491,791 A | 2/1996 | Glowny et al. |
| 5,495,610 A | 2/1996 | Shing et al. |
| 5,539,877 A | 7/1996 | Winokur et al. |
| 5,745,479 A | 4/1998 | Burns et al. |
| 5,784,549 A | 7/1998 | Reynolds et al. |
| 5,933,594 A | 8/1999 | La Joie et al. |
| 5,964,891 A | 10/1999 | Caswell et al. |
| 5,983,364 A | 11/1999 | Bortcosh et al. |
| 6,085,244 A | 7/2000 | Wookey |

(Continued)

OTHER PUBLICATIONS

Merriam; Method, System and Program for Diagnosing a Computer in a Network System; Dossier BLD919990020; International Business Machines Corporation; USA.

*Primary Examiner*—Philip Guyton
*Assistant Examiner*—Elmira Mehrmanesh
(74) *Attorney, Agent, or Firm*—Brandon C. Kennedy; Cynthia S. Seal; Biggers & Ohanian, LLP

(57) ABSTRACT

A method of providing diagnostic service for a data processing system includes retrieving product data identifying a data processing element in response to an alert generated by the element. The retrieved product data is forwarded to a networked diagnostic site. A diagnostic package is retrieved, the diagnostic package including diagnostic code appropriate for the alerting element. The diagnostic package is forwarded to the data processing system. The diagnostic code is then installed and executed to perform diagnostic testing of the element. Results generated during execution of the diagnostic code may then be used to take machine initiated corrective action. After the results have been generated, the diagnostic software is uninstalled from the data processing system.

6 Claims, 4 Drawing Sheets

U.S. PATENT DOCUMENTS

| | | |
|---|---|---|
| 6,170,065 B1 | 1/2001 | Kobata et al. |
| 6,195,763 B1 * | 2/2001 | Mayer et al. .................. 714/25 |
| 6,260,160 B1 * | 7/2001 | Beyda et al. .................. 714/27 |
| 6,279,125 B1 * | 8/2001 | Klein .......................... 714/38 |
| 6,357,017 B1 | 3/2002 | Bereiter et al. |
| 6,425,093 B1 * | 7/2002 | Singh et al. .................. 714/38 |
| 6,539,499 B1 | 3/2003 | Stedman et al. |
| 6,553,515 B1 | 4/2003 | Gross et al. |
| 6,598,183 B1 | 7/2003 | Grieco et al. |
| 6,676,018 B1 | 1/2004 | Trelawney et al. |
| 6,742,141 B1 * | 5/2004 | Miller ......................... 714/26 |
| 7,124,326 B1 * | 10/2006 | Niikawa ....................... 714/37 |
| 2004/0153823 A1 * | 8/2004 | Ansari ......................... 714/38 |

* cited by examiner

AUTOMATED DIAGNOSTIC SERVICE

CROSS-REFERENCE TO RELATED APPLICATION

This application is a continuation application of and claims priority from U.S. patent application Ser. No. 10/462,254, filed on Jun. 16, 2003, now U.S. Pat. No. 7,350,112.

BACKGROUND

1. Field of the Present Invention

The present invention generally relates to the field of data processing systems and networks and more particularly to performing diagnostic routines on such systems and networks.

2. History of Related Art

Performing conventional diagnostics on data processing systems and networks of such systems requires the manual intervention of a systems manager, field service engineer, or the like. Typically, the systems manager identifies a problem associated with a particular element of the system, perhaps in response to some form of interrupt, warning message, or other alert generated by a system element. In other cases, the systems manager may simply suspect that a system has a problem. The systems manager then typically gathers information regarding the problematic element and downloads the latest version of diagnostics for the system or element in question. Once downloaded, the systems manager installs the software on the system, runs the diagnostic, analyzes the results, and determines how to fix the problem. The method of diagnosing a system requires a level of human interaction that is undesirably high. It would be beneficial to implement a method and system to automate the diagnostic function to the greatest extent possible.

SUMMARY OF THE INVENTION

The goal identified above is achieved by a method of providing diagnostic service for a data processing system according to the present invention. The diagnostic method includes retrieving product data identifying a data processing element in response to an alert generated by the element. The retrieved product data is forwarded to a networked diagnostic site. A diagnostic package is retrieved, the diagnostic package including diagnostic code appropriate for the alerting element. The diagnostic package is forwarded to the data processing system. The diagnostic code is then installed and executed to perform diagnostic testing of the element. Results generated during execution of the diagnostic code may then be used to take machine initiated corrective action. The diagnostic site may be a site on the Internet or a local replica of such a site.

BRIEF DESCRIPTION OF THE DRAWINGS

Other objects and advantages of the invention will become apparent upon reading the following detailed description and upon reference to the accompanying drawings in which.

Figure 1:
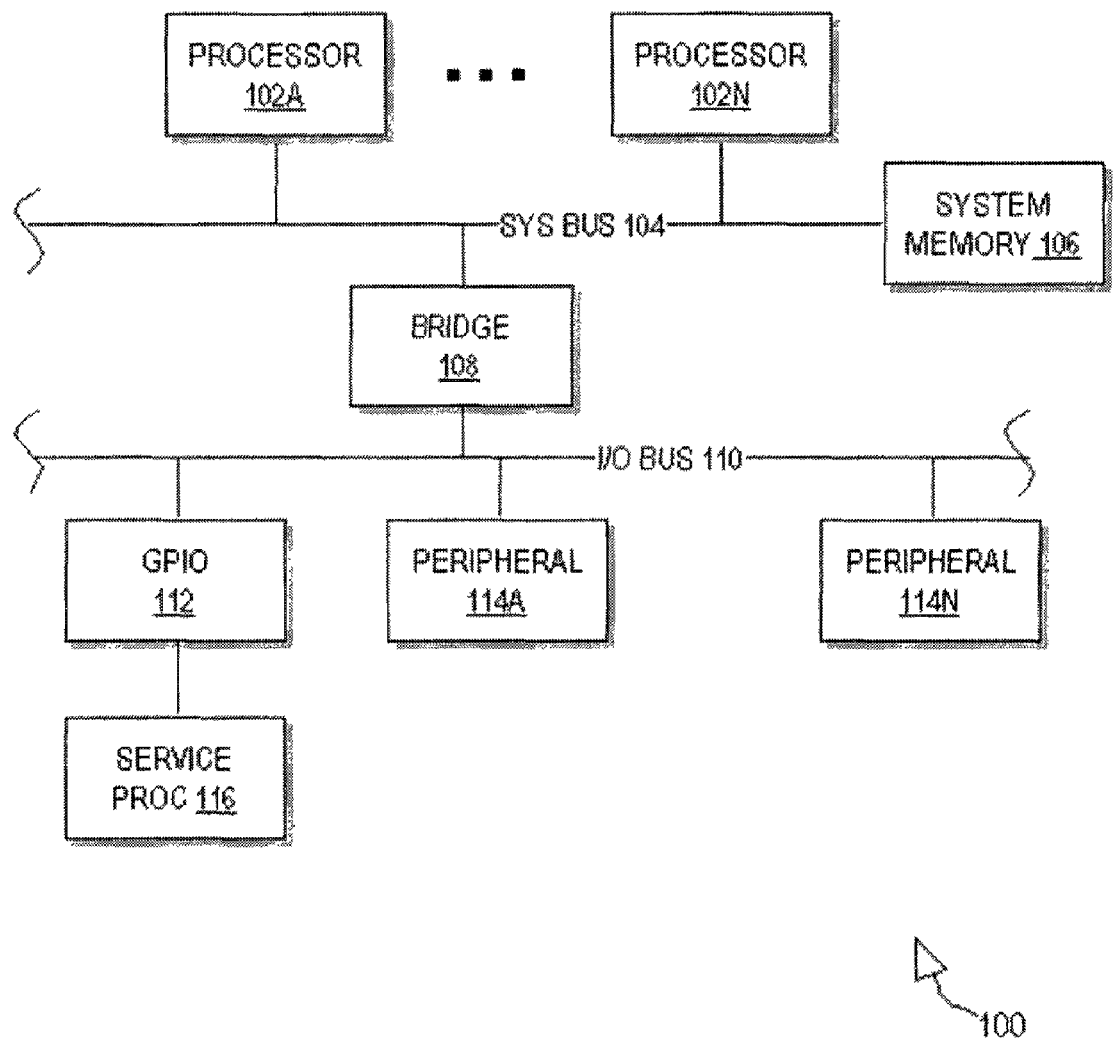
FIG. 1 is a block diagram of selected elements of a server, server blade, or blade suitable for use in various embodiments of the invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the present invention contemplates an automated diagnostic service method and system for use in a networked data processing environment. Software or hardware elements in a particular system or network generate alerts in response to problems. These alerts are routed to a management agent that then retrieves information about the problem element. Using the element information, the management agent accesses a diagnostic database to retrieve the most current diagnostic routine available for the problem element. The diagnostic routine is then installed on the problem system, executed, and the resulting diagnostic information is retrieved by the management agent. Based on the results of the diagnostic run, the management agent takes corrective action, if possible, such as downloading an updated driver for a system component Turning now to the drawings, FIG. 1 is a block diagram of selected features of a data processing system 100 suitable for use in conjunction with the present invention. The depicted elements of data processing system 100 may be implemented entirely upon a single printed circuit board. In this embodiment, data processing system 100 may be alternatively referred to herein as server blade 100. In the depicted embodiment, server blade 100 includes a set of main processors 102A through 102N (generically or collectively referred to as processor(s) 102) that are connected to a system bus 104. A common system memory 106 is accessible to each processor 102 via system bus 104. The system memory is typically implemented with a volatile storage medium such as an array of dynamic random access memory (DRAM) devices. The depicted architecture of server blade 100 is frequently referred to as a symmetric multiprocessor (SMP) system because each processor 102 has substantially equal access to system memory 106.

In the depicted embodiment of server blade 100, a bus bridge 108 provides an interface between system bus 104 and an I/O bus 110. One or more peripheral devices 114A through 114N (generically or collectively referred to as peripheral device(s) 114) as well as a general purpose I/O (GPIO) port 112 are connected to I/O bus 110. Peripheral devices 114 may include devices such as a graphics adapter, a high-speed network adapter or network interface card (NIC), a hard-disk controller, and the like. I/O bus 110 is typically compliant with one of several industry standard I/O bus specifications including, as a common example, the Peripheral Components Interface (PCI) bus as specified in *PCI Local Bus Specification Rev* 2.2 by the PCI Special Interest Group (www.pcisig.com).

The depicted embodiment of server blade 100 includes a local service processor 116 connected to GPIO port 112. Local service processor 116 is configured to provide support for main processors 102. This support may include, for example, monitoring the power supplied to main processor(s) 102 and, in the event of a blade crash, initiating a restart of the main processors.

Figure 2:
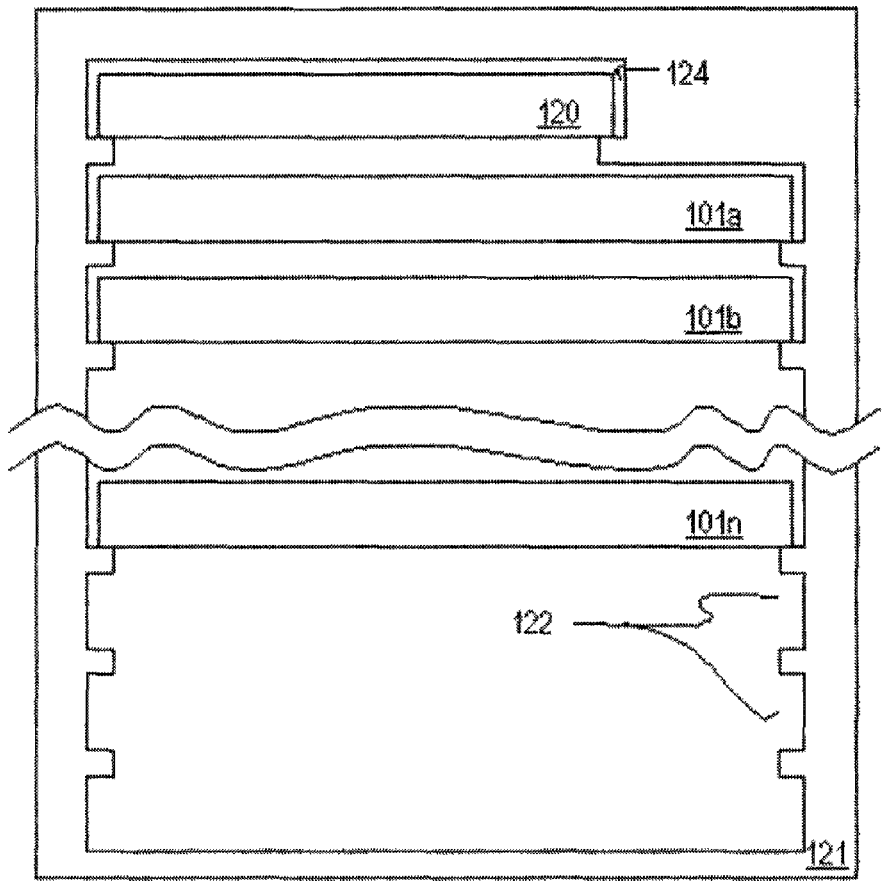
FIG. 2 illustrates selected elements of a blade center data processing network suitable for use in various embodiments of the invention.
Figure 2:

Turning now to FIG. 2, selected elements of a data processing network 111 according to one implementation of the present invention is depicted. Data processing network 111, also referred to as a blade center 111, includes a rack enclosure or cabinet 121 that includes a plurality of slots or racks 122. Each rack 122 is configured to receive a rack mounted device such as a server blade chassis identified by reference numerals 101a through 101n (generically or collectively referred to as server blade chassis 101) via a suitable connection mechanism such as a traditional edge connector. Each server blade chassis 101 typically contains one or more server blades 100 as described with respect to FIG. 1. In one implementation, each server blade chassis 101 is a 4U component that may include as many as 16 server blades 100. Thus, the depicted embodiment of blade center 111 includes a set of server blade chassis 101, each of which includes one or more server blades 100. Each server blade 100 within server blade chassises 111a through 101n is typically connected to a local area network (LAN) through its NIC(s) such that server blades 100 in system 111 can communicate with each other. Blade center 111 may itself be connected to a local area network or intranet to which other blade centers, servers, and other network devices are connected. The entire local area network is likely connected to an external wide area network, such as the Internet, through a gateway or other suitable network device.

As discussed with respect to FIG. 1, one embodiment of server blade 100 includes a local service processor 116 configured to monitor the blade's main processor(s) 102. Network 111 as depicted in FIG. 2 further includes a system management module 120 that is inserted into a slot 124 in cabinet 121. In the depicted embodiment, the dimension of management module 120 is different than the dimension of server blades 100 and management module slot 124 is sized to receive management module 120 while preventing inadvertent insertion of a server blade 100 into the slot. Management module 120 is typically implemented with a management module service processor configured to monitor and control resources and characteristics of network 111 that are shared by each server blade 100. These resources and characteristics may include, for example, the power applied to cabinet 121, cabinet cooling fans, and environmental characteristics such as the ambient temperature within cabinet 121.

Portions of the present invention may be implemented as a sequence of processor executable instructions (software) for performing diagnostic servicing of a data processing network where the instructions are stored on a computer readable medium. During execution, portions of the software may reside in a volatile storage element such as the system memory 106 depicted in FIG. 1 or an external or internal cache memory (not depicted) of main processor(s) 102. At other times, portions of the software may be stored on a non-volatile storage medium such as a floppy diskette, hard disk, CD ROM, DVD, magnetic tape, or other suitable storage medium. In addition, management module 120 may execute portions of the software while the local service processors 116 of each server blade 100 may execute other portions.

Figure 3:
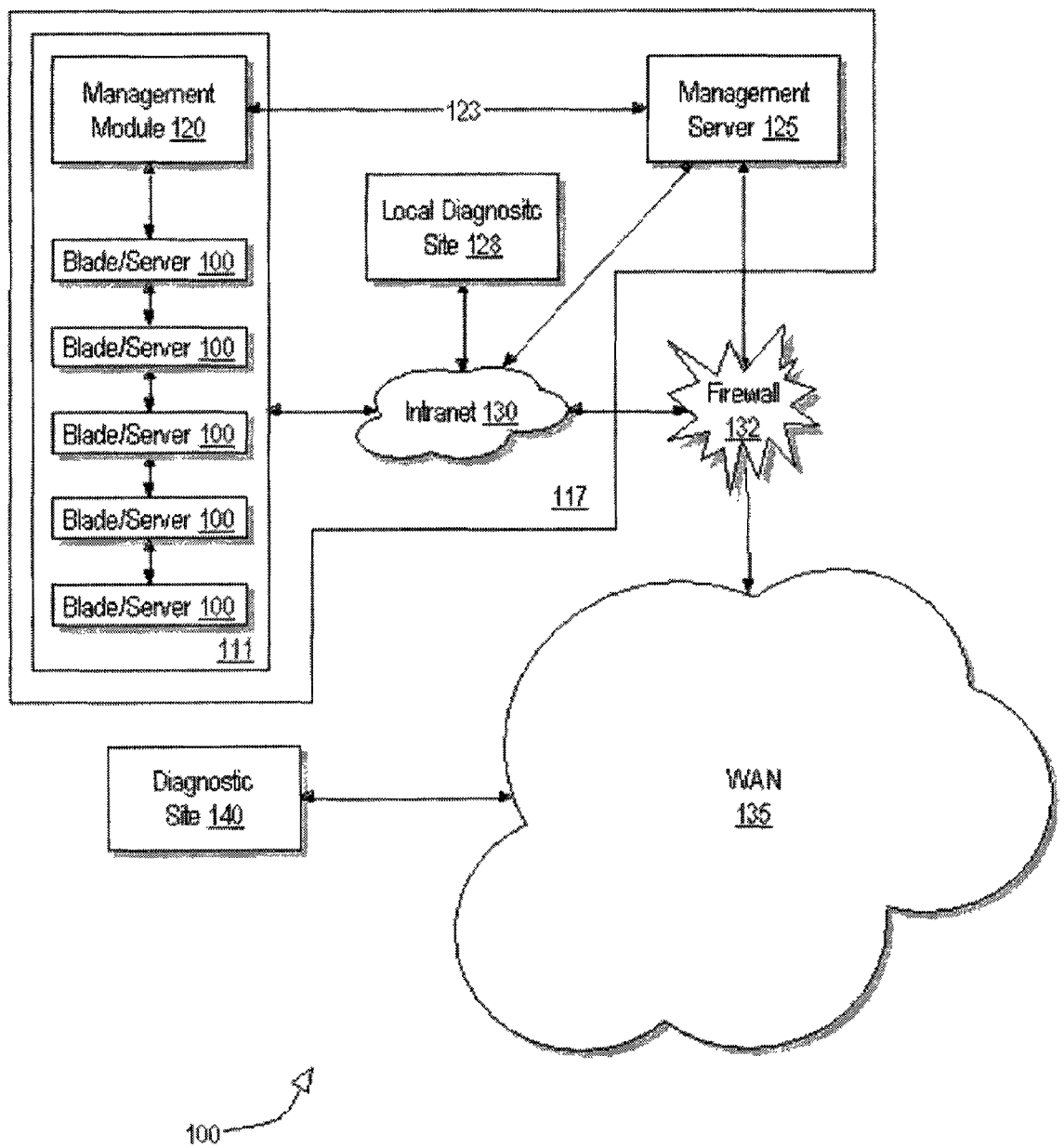
FIG. 3 depicts selected elements of a local area network emphasizing automated diagnostic servicing elements of the present invention.

Referring now to FIG. 3, selected elements of a local area network or LAN 117 suitable for use with an embodiment of the present invention is depicted. LAN 117 includes a set of interconnected data processing systems and a management server 125 all connected to an Ethernet intranet 130 although token ring and other network connectivity implementations may be used. Management server 125 is a dedicated server for monitoring the configuration and functionality of the data processing elements in LAN 117. Management module 120 is configured to facilitate communication between blade center 111 and management server 125.

In the depicted embodiment, the set of interconnected data processing systems in LAN 117 is implemented as a blade center 111 that includes a set of server blades 100 and a management module 120 although this is also an implementation detail. In other embodiments, the collection of data processing devices may be implemented with conventional standalone server systems, desktop systems, workstations, and so forth.

In the depicted embodiment of LAN 117, the management module 120 of blade center 111 is connected to management server 125 by a dedicated link referred to herein as management network 123. Management network 123 enables communication between management server 125 and one or more management modules 120 outside of or sideband with respect to intranet 130 thereby enabling management functionality independent of the functional status of intranet 130. Management network 123 can be an Ethernet link or any of various industry standard serial busses such as I2C, RS-232, USB, and the like.

The diagnostic service elements of the present invention work in conjunction with a network accessible diagnostic web site or other form of data center. In the depicted embodiment of LAN 117, the diagnostic data center is represented by an external diagnostic site 140, accessible via a wide area network (WAN) 135 such as the Internet through a firewall 132, and a local replica 128 of site 140, accessible via intranet 130. Diagnostic sites 128 and 140 include one or more diagnostic programs, routines, sequences, and so forth suitable for diagnosing various data processing hardware and software elements. A provider of diagnostic servicing is responsible for maintaining the content of diagnostic site 140 with the most current diagnostic routines available for all of the elements of the major functional elements of LAN 117. The diagnostic routines that are found on sites 140 and 128 include code that can be downloaded, installed, executed, and uninstalled by a remote agent.

Automated diagnostic servicing is achieved by configuring management module 120 and management server 125 to communicate critical information in response to an alert generated by any of the blades 100 or other data processing elements of blade center 111. The data processing elements that may generate an alert include any device, subsystem, or software (DSS) in blade center 111. The information communicated to management server 125 in response to an alert includes vital product data (VPD) that uniquely identifies the alerting DSS to management module 120. Each blade 100 as well as other subsystems and software may have unique VPD codes associated with them. In the case of a blade 100, for example, the VPD code is likely stored in non-volatile memory on the blade.

Management module 120 is configured to access local diagnostic site 128, external diagnostic site 140, or both upon receiving an alert indicator and the associated VPD. Using the VPD, management module 120 submits a request to the appropriate diagnostic site. The diagnostic site, in turn, uses the VPD to locate diagnostic code appropriate for the alerting DSS. The diagnostic code located by the diagnostic site is then downloaded to management server 125. Management server 125 then installs the downloaded code on the appropriate system, perhaps in conjunction with management module 120, and initiates execution of the diagnostic code. When diagnostic code execution completes, the code can be uninstalled to conserve valuable storage. In addition, management server 125 may then analyze the diagnostic results and, if appropriate, take corrective action including, as an example, updating old or corrupted firmware or drivers.

Figure 4:
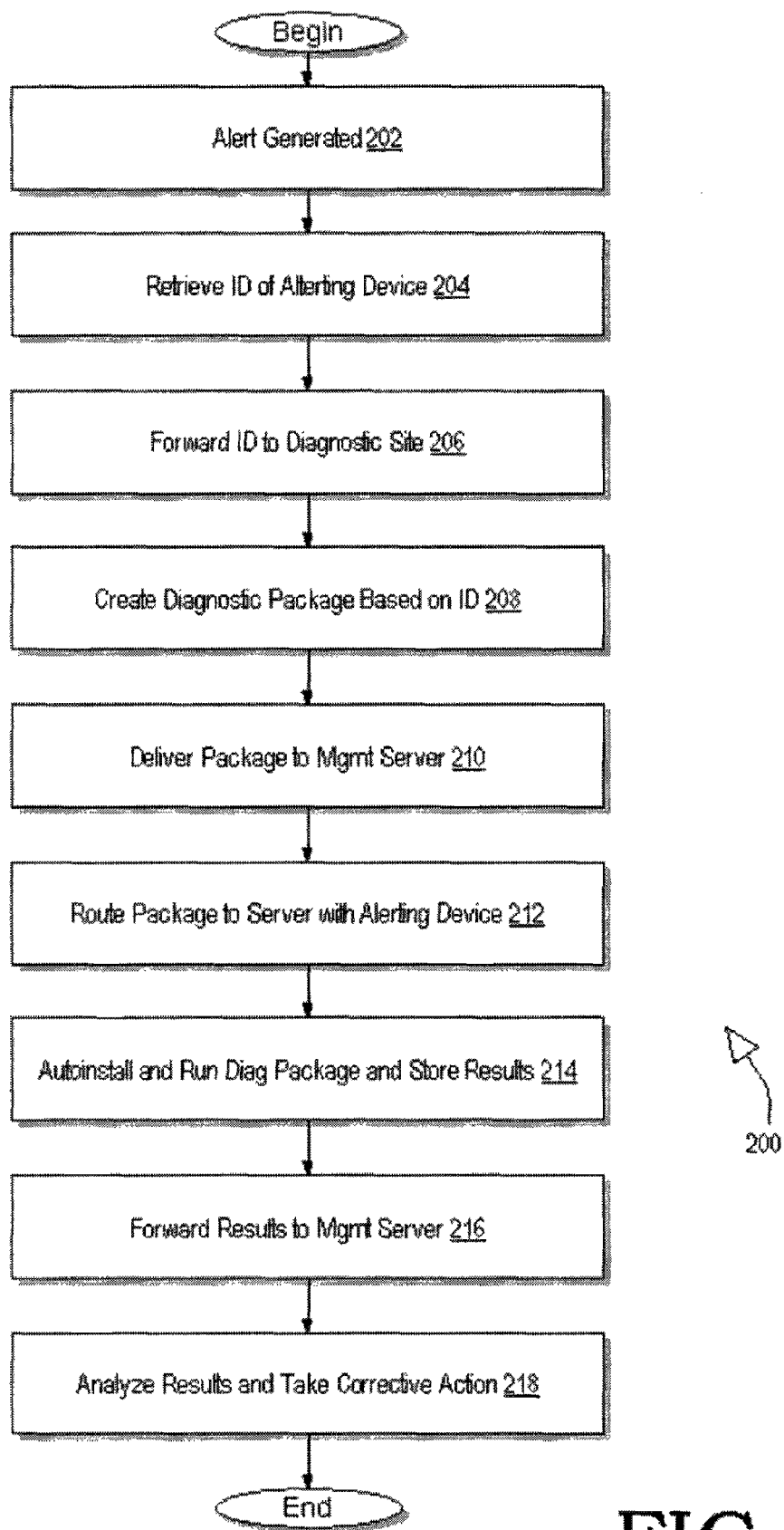
FIG. 4 is a flow diagram illustrating a method of providing data processing system diagnostic services according to one embodiment of the invention.

Referring now to the flow diagram of FIG. 4, a method 200 of providing diagnostic services for a data processing system or network is presented. Diagnostic servicing as depicted in FIG. 4 begins when an element of the data processing network generates (block 202) an alert. As described above, the alerting element (DSS) can be a software element, a device such as a blade 100, a subsystem such as a network interface card or a disk drive. The alert itself can originate from a hardware interrupt, an operating system error message or warning, or from an application program.

In the environment of LAN 117 as shown in FIG. 3, an alert is handled by management server 125. Management server 125 may receive the alert directly via intranet 130 or indirectly from management module 120 via the management network 123. In response to an alert, management server 125 retrieves or determines (block 204) the identity of the alerting DSS. The identity information according to one embodiment includes vital product data (VPD) that uniquely identifies the alerting DSS.

Management server 125 then forwards (block 206) the VPD and any other information needed to identify the alerting DSS to a network-connected diagnostic site. In LAN 117 as depicted in FIG. 3, the diagnostic site can be, for example, a site 140 on an external network such as the Internet or a local replica 128 of the external site. In either case, the diagnostic site is enabled to receive, from a network, information identifying a particular DSS in a system connected to the web site. As its name suggests, the diagnostic site has access to an archive of diagnostic programs and routine for different data processing systems, devices, and software. The diagnostic site responds to the receipt of DSS identification information by using the VPD to create (block 208) a download package tailored for the alerting DSS. The download package includes diagnostic code that, when executed on the alerting DSS, performs an appropriate diagnostic check of the DSS. The diagnostic site may compress, encrypt, or otherwise format the diagnostic code for secure and efficient transport over the network. The diagnostic site then delivers (block 210) the download package to LAN 117 and, more specifically, to management server 125.

Upon receiving a download package from a diagnostic site, management server 125 deploys (block 212) the download package to the blade or server 100 in which the alerting DSS resides. The server receiving the download package then auto installs (block 214) and executes the diagnostic code. The diagnostic code will typically produce diagnostic results containing information about any problems encountered by the diagnostic code. When execution of the diagnostic code completes, the results are stored, and the diagnostic code is uninstalled from the server. An alert containing the diagnostic results is then generated and forwarded (block 216) to the management server 125.

Management server 125 is enabled to analyze (block 218) the diagnostic results contained in a results alert. If the management server is capable of resolving the problem indicated by the diagnostic results, it will perform the appropriate corrective action. Otherwise, the management server will notify the service provider to schedule a field service visit to address problems that could not be resolved by the management server on its own.

Illustrating an application of the invention, a company may backup its data to tape every Saturday at 2:00 a.m. If a problem is encountered while performing this backup, the backup application or a monitoring daemon or both analyzes the tape drive for problems. If a problem is detected, an alert is generated and published with the problem information. Management server 125 receives this alert and collects the latest diagnostic support file from the external diagnostic site 140. The diagnostic software on the diagnostic site may be provided by the vendor of the alerting device, by the provider of the diagnostic servicing, or both. The management server then pushes the diagnostic package down to the managed server where the problem occurred. The package is automatically installed, executed, and uninstalled. Before being uninstalled, the results of the diagnostic code are packaged into an alert and sent back to the Management Server 125. Upon receiving the data, the management server 125 performs problem determination on the data to determine the proper corrective action. If the corrective action can be performed by the management server 125 (e.g., firmware downlevel or driver downlevel), it performs the corrective action. Otherwise, the corrective action is published by alerting the diagnostic service provider with all appropriate information. If the problem is fixed with a firmware/driver update, the server with the tape drive has fixed itself and the next backup will proceed smoothly.

It will be apparent to those skilled in the art having the benefit of this disclosure that the present invention contemplates a method of providing automated diagnostic servicing in a networked environment. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A data processing system employing automated diagnostic servicing, the data processing system comprising a computer processor, a computer memory operatively coupled to the computer processor, the computer memory having disposed within it computer code means, the data processing system further comprising:
 a diagnostic site including computer code means for responding to receipt of identification information by generating a diagnostic package including diagnostic code for a data processing element corresponding to the identification information and further including code means for forwarding the diagnostic package to a sender of the identification information; and
 a management server configured to receive an alert from an element of the data processing system, the alert including the identification information indicating the data processing element generating the alert and, in response thereto, to send the identification information to the diagnostic site via a network and further configured to respond to receipt of the diagnostic package from the diagnostic site by installing and executing the diagnostic code.

2. The system of claim 1, wherein the diagnostic code is further enabled to package results generated during execution of the diagnostic code into a results alert and to send the results alert to the management server of the data processing system.

3. The system of claim 1, wherein the management server is enabled to use results generated during execution of the diagnostic code to take corrective action.

4. The system of claim 1, wherein the management server is enabled to uninstall the diagnostic code after executing it.

5. The system of claim 1, wherein the diagnostic site is further characterized as a diagnostic site on an external network.

6. The system of claim 1, wherein the diagnostic site is further characterized as a local replica of a diagnostic site on an external network.

* * * * *